(12) United States Patent
Hijlkema

(10) Patent No.: US 10,293,803 B2
(45) Date of Patent: May 21, 2019

(54) LEVITATION SYSTEM FOR A TRAIN

(71) Applicant: Novus Finitor B.V., Joure (NL)

(72) Inventor: Bernardus Ludgerus Lubertus Hijlkema, Leeuwarden (NL)

(73) Assignee: Novus Finitor B.V., Joure (NL)

( * ) Notice: Subject to any disclaimer, the term of this patent is extended or adjusted under 35 U.S.C. 154(b) by 278 days.

(21) Appl. No.: 15/088,696

(22) Filed: Apr. 1, 2016

(65) Prior Publication Data

US 2017/0028999 A1 Feb. 2, 2017

Related U.S. Application Data

(63) Continuation of application No. 14/000,753, filed as application No. PCT/NL2012/000015 on Feb. 21, 2012.

(30) Foreign Application Priority Data

Feb. 21, 2011 (NL) .................................... 2006269

(51) Int. Cl.
| | | |
|---|---|---|
| *B60V 3/04* | (2006.01) | |
| *B61B 13/08* | (2006.01) | |
| *B60V 1/04* | (2006.01) | |
| *B60V 1/14* | (2006.01) | |
| *B61F 5/52* | (2006.01) | |
| *B61F 99/00* | (2006.01) | |

(52) U.S. Cl.
CPC ................ *B60V 3/04* (2013.01); *B60V 1/046* (2013.01); *B60V 1/14* (2013.01); *B61B 13/08* (2013.01); *B61F 5/52* (2013.01); *B61F 99/00* (2013.01)

(58) Field of Classification Search
CPC ...... B61B 13/08; H02K 41/031; H02K 41/06; B60V 3/04; B60L 2200/26
USPC ........................ 104/23.1, 23.2, 290, 292, 294
See application file for complete search history.

(56) References Cited

U.S. PATENT DOCUMENTS

| | | | |
|---|---|---|---|
| 3,121,401 A | | 2/1964 | Fields |
| 3,164,103 A | * | 1/1965 | Lathers .................... B60V 3/04 104/134 |
| 3,330,221 A | * | 7/1967 | Trillo ....................... B60V 3/04 104/120 |
| 3,330,384 A | * | 7/1967 | Bertin ...................... B60V 3/04 104/120 |
| 3,332,361 A | * | 7/1967 | Bertin ...................... B60V 3/04 104/120 |
| 3,347,170 A | * | 10/1967 | Bertin ...................... B60V 3/04 104/120 |
| 3,385,228 A | * | 5/1968 | Chung .................... B60L 13/03 104/23.2 |
| 3,385,390 A | | 5/1968 | Guienne |
| 3,392,800 A | | 7/1968 | Swamy |
| 3,414,076 A | | 12/1968 | Bertin et al. |

(Continued)

*Primary Examiner* — Zachary L Kuhfuss

(74) *Attorney, Agent, or Firm* — The Webb Law Firm

(57) ABSTRACT

The present invention relates to a fender, bogie, train, track and methods. The fender according to the invention comprises:
  a support surface provided on the underside during use;
  an inner pressure chamber provided in or on the support surface;
  a feed arranged in the pressure chamber for feeding a fluid;
  a first rim present round the inner pressure chamber, wherein at least a part of the rim is flexible; and
  a second rim arranged round the first rim such that a pressure chamber is created between two adjacent rims.

20 Claims, 17 Drawing Sheets

(56) References Cited

U.S. PATENT DOCUMENTS

| | | | |
|---|---|---|---|
| 3,459,137 A | 8/1969 | Bertin et al. | |
| 3,467,024 A * | 9/1969 | Broniewski | B60V 3/04 104/134 |
| 3,585,939 A * | 6/1971 | Laithwaite | B60L 13/03 104/23.2 |
| 3,587,772 A | 6/1971 | Jaumotte | |
| 3,602,147 A * | 8/1971 | Hart | B60V 3/04 104/23.2 |
| 3,623,433 A * | 11/1971 | Jarvis | B60L 15/005 104/23.2 |
| 3,623,434 A * | 11/1971 | Jarvis | B60L 15/005 104/23.2 |
| 3,648,620 A * | 3/1972 | Bertin | B60V 3/04 104/155 |
| 3,658,010 A * | 4/1972 | Du Merle | B60V 3/04 104/120 |
| 3,680,488 A * | 8/1972 | Donlon | B60V 3/04 104/130.07 |
| 3,680,489 A | 8/1972 | English | |
| 3,695,383 A * | 10/1972 | Cruchant | B60V 1/16 104/23.2 |
| 3,696,753 A * | 10/1972 | Ross | B60L 13/003 104/123 |
| 3,698,506 A * | 10/1972 | Croix-Marie | B60V 3/04 104/23.2 |
| 3,797,399 A | 3/1974 | Bertin et al. | |
| 3,854,418 A | 12/1974 | Bertin | |
| 3,901,161 A * | 8/1975 | Bertin | B60V 3/04 104/23.2 |
| 3,901,162 A * | 8/1975 | Bertin | B60V 3/04 104/23.2 |
| 3,939,776 A * | 2/1976 | Ross | B60G 17/0157 104/23.2 |
| 4,061,089 A | 12/1977 | Sawyer | |
| 4,550,663 A * | 11/1985 | DeViaris | B60V 3/04 104/119 |
| 4,627,362 A | 12/1986 | Ise et al. | |
| 4,756,187 A | 7/1988 | Gatti | |
| 4,843,969 A * | 7/1989 | Chaffee | B60V 3/025 104/23.2 |
| 4,844,194 A | 7/1989 | De Alessi et al. | |
| 4,993,327 A * | 2/1991 | Labarre | B61B 13/08 104/290 |
| 5,174,215 A * | 12/1992 | Barrows | B60L 15/005 104/288 |
| 5,263,419 A * | 11/1993 | Moroto | B60K 7/0007 104/243 |
| 5,317,976 A * | 6/1994 | Aruga | B60L 13/10 104/282 |
| 5,542,356 A * | 8/1996 | Richert | B60L 11/182 104/130.02 |
| 5,668,421 A | 9/1997 | Gladish | |
| 5,909,710 A | 6/1999 | Cummins | |
| 6,431,077 B1 * | 8/2002 | Hijlkema | B61B 13/08 104/23.1 |
| 6,510,799 B2 * | 1/2003 | Lamb | B60L 13/04 104/281 |
| 6,530,444 B2 * | 3/2003 | Miyazawa | B60V 3/04 104/23.2 |
| 6,899,036 B2 * | 5/2005 | Lamb | B60L 13/04 104/281 |
| 7,204,192 B2 * | 4/2007 | Lamb | B60L 13/04 104/281 |
| 7,527,001 B2 * | 5/2009 | Li | B61B 13/08 104/281 |
| 8,347,789 B2 * | 1/2013 | Wolf | B60L 5/005 104/290 |
| 2001/0045311 A1 | 11/2001 | Miyazawa et al. | |
| 2003/0205163 A1 | 11/2003 | Lamb et al. | |
| 2015/0034401 A1 * | 2/2015 | Hijlkema | B60V 3/04 180/117 |
| 2018/0056810 A1 * | 3/2018 | Lee | B61B 13/125 |

\* cited by examiner

LEVITATION SYSTEM FOR A TRAIN

CROSS-REFERENCE TO RELATED APPLICATIONS

This application is a continuation of U.S. patent application Ser. No. 14/000,753, filed Nov. 5, 2013, which is a national stage application of International Application No. PCT/NL2012/000015, filed Feb. 21, 2012, which claims priority to Netherlands Application No. 2006269, filed Feb. 21, 2011, all of which are incorporated herein by reference in their entirety.

BACKGROUND OF THE INVENTION

Field of the Invention

The present invention relates to a fender.

Description of Related Art

Fenders are known in practice, for instance in hovercrafts. Another known fender, suitable for use for a train, is described in NL 1007109.

Known fenders are beset with a number of practical problems, including having to provide large support surfaces and having to supply sufficient liquid or air for the purpose of supporting a load.

SUMMARY OF THE INVENTION

The present invention has for its object to reduce or wholly obviate the existing problems.

For this purpose the invention comprises a fender, the fender comprising:
- a support surface provided on the underside during use;
- an inner pressure chamber provided in or on the support surface;
- a feed arranged in the pressure chamber for feeding a fluid;
- a first rim present round the inner pressure chamber, wherein at least a part of the rim is flexible; and
- a second rim arranged round the first rim such that a pressure chamber is created between two adjacent rims.

Providing a flexible rim, at least for a part of this rim, is found to realize an additional pressure increase, whereby a significant increase in the load-bearing capacity of the fender is realized.

An improved load-bearing capacity results from providing at least one extra pressure chamber. In the currently preferred embodiment this results during use in a decreasing pressure variation from the inner pressure chamber to an outer rim, wherein the fluid flows laterally as seen from the inner pressure chamber to the outer rim.

Air is preferably used as fluid. If desired, other gases or liquids can also be used in addition to air. Air has the additional advantage that it is light and widely available. The rim preferably comprises a feed for feeding the fluid.

At least three rims are preferably also provided, preferably four, more preferably at least six and most preferably at least eight.

It is noted that 35 rims can for instance also be provided if suitable thicknesses of the rims are chosen.

Additional pressure increases can be realized by providing additional rims with additional pressure chambers located therebetween. It is hereby possible to further increase the total load-bearing capacity along the fender according to the present invention.

At least a part of the rims is preferably provided movably to some extent relative to each other and/or the support surface.

By providing flexible rims, wherein a relative movement is possible between the rims and/or between a rim and the support surface of the fender, friction is for instance reduced and the air consumption can also be reduced. In addition, the roughness of the track is however also less critical. This means in practice that good results can still be achieved with a rougher track.

The rims can comprise metal or a plastic.

The rims preferably comprise aluminium.

Flexibly arranged, relatively stiff rims are obtained by combining one or more flexible rims comprising relatively stiff rings made from aluminium plate, wherein in a currently preferred embodiment annular air chambers are provided on the upper side of these rings.

In an alternative embodiment the rings are manufactured from an inflatable material in order to further increase the overall flexibility. Such rims are for instance air-inflatable or can be filled with another gas or optionally with a liquid.

The fender as described above can for instance be used as for instance a bogie of a train, although other applications are also possible, for instance for a boat or vehicle.

The invention further also relates to a bogie for a train, comprising a fender as described above.

Such a bogie provides the same effects and advantages as described for the fender.

The bogie preferably comprises a contactless drive. Such a contactless drive is preferably provided with a number of permanent magnets on a rotating disc which are positioned such that rotation along a guiding strip or track realizes a propelling force. In this way a type of contactless drive can be realized in effective manner with which the bogie is displaceable relative to the guiding strip. The guiding functions here as conductor. An effective and energy-efficient drive is hereby realized.

The invention further also relates to a train provided with a bogie as described above and/or to a track suitable for such a bogie.

Such a train and track provide the same effects and advantages as described in respect of the fender and/or the bogie.

In a currently preferred embodiment the track comprises a strip of conductive material provided on either side of the track for the purpose of the contactless drive. Alternatively or additionally, the track is provided with a recess in which at least one strip of conductive material is provided for the drive. In an advantageous preferred embodiment the track is also provided with at least one recess such that a track section of this track can be placed over an existing railway track. Use can in this way be made of an existing track which is preferably suitable for a train based on a bogie as described above as well as a conventional train.

The invention further also relates to a method for supporting an element, such as a train as described above, comprising a fender as also described above, and to a method for propelling an element such as a train, comprising of providing a bogie as described above.

The stated methods provide the same effects and advantages as described for the fender, bogie, train or track.

BRIEF DESCRIPTION OF THE DRAWINGS

Further advantages, features and details of the invention are elucidated on the basis of preferred embodiments thereof, wherein reference is made to the accompanying drawing, in which.

DESCRIPTION OF THE INVENTION

Figure 1:
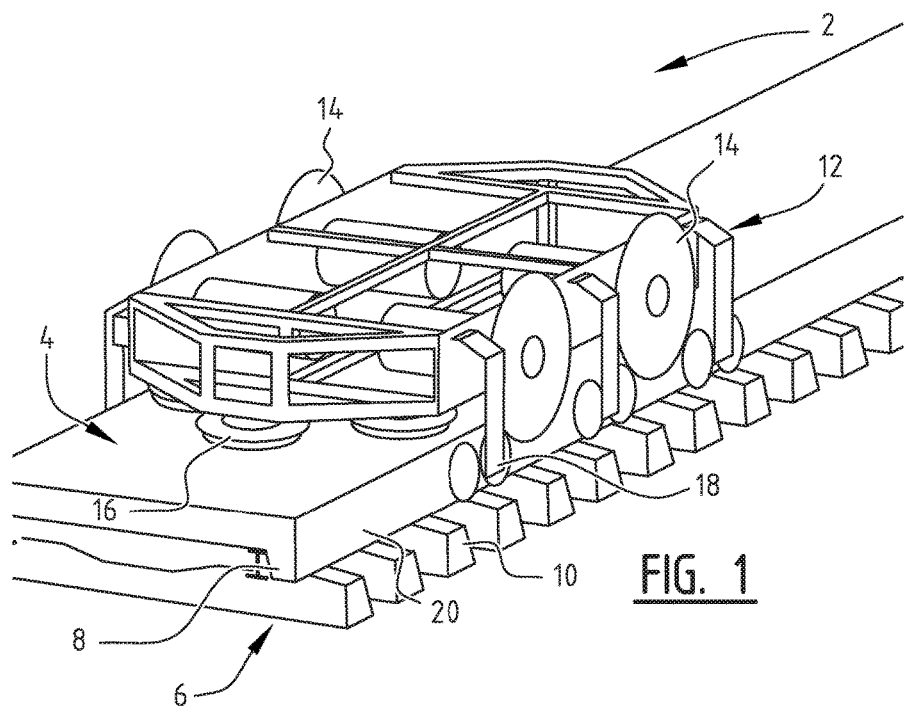
FIG. 1 shows a bogie according to the invention.

A bogie 2 (FIG. 1) is shown on a track 4 of a conventional railway 6. This conventional railway 6 consists of train rails 8 and sleepers 10. Bogie 2 is provided with a drive 12. Drive 12 comprises four rotating discs 14, two on either side of bogie 2. Fenders 16 are also provided. Guides 18, embodied in the shown embodiment as fenders, are also arranged for safety purposes. The track is provided on the sides with a guiding strip 20 for the purpose of the driving. Such a bogie 2 can be used for a train 22 (FIG. 2).

An embodiment of a fender 24 (FIG. 3) is provided with a support surface 26 which acts on an underlying track section 28. In the shown embodiment a fender has six rims 30, wherein the rim comprises a ring which is made from an aluminium plate and above which is provided an annular air chamber 32 which can be actuated. Alternatively, another metal or a plastic is used for the rim. The actuation is also possible by means of other power sources, such as hydraulic or pneumatic cylinders, spring constructions, etc. Feed channels 34 can individually adjust rims 30. Feed channel 36 provides air to the inner pressure chamber. The pressure chambers between rims 30 are optionally provided with a feed channel (not shown). The diameter of rims is about 200 mm and the height of the recess for the fender is about 65 mm, wherein the fender is fixed in horizontal direction with a connection 38.

Figure 3:
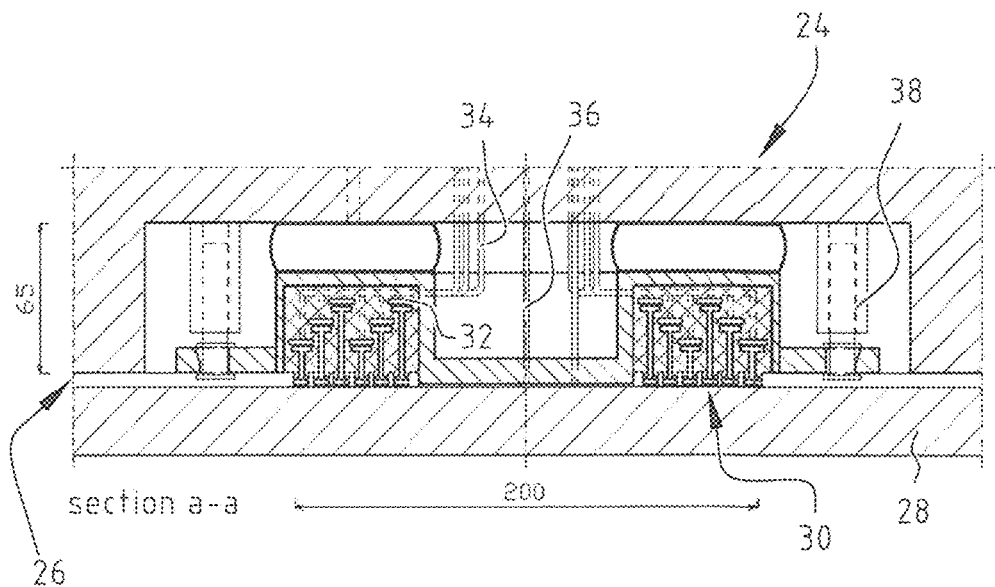
FIG. 3 shows a cross-section of a fender according to the invention.
Figure 4:
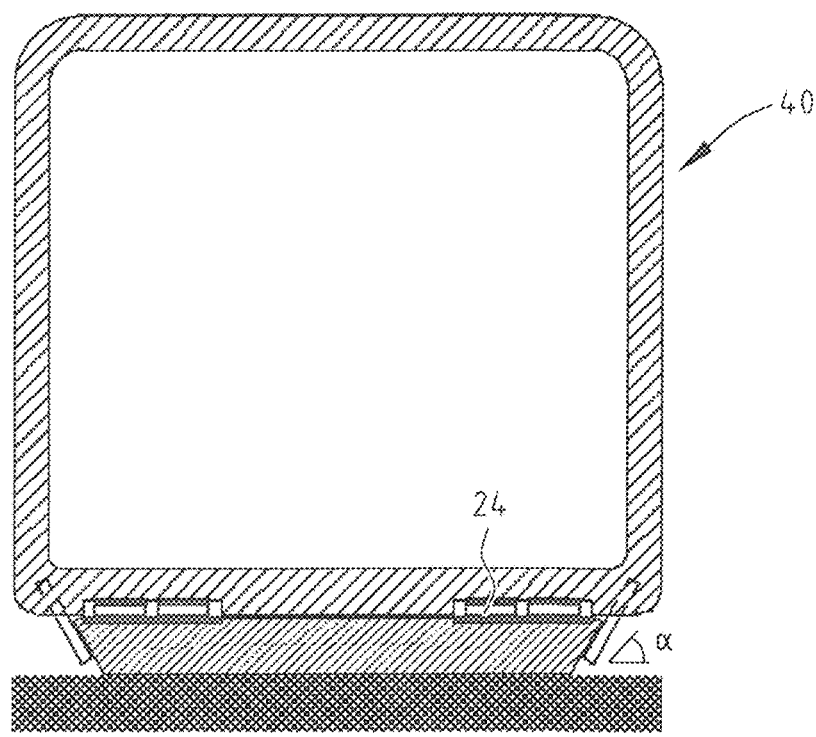
FIG. 4 shows a view of such a fender provided in a train element of FIG. 2.

In a possible first embodiment of the fender a train 40 (FIG. 4) is provided with a fender 24 as shown in FIG. 3. The drive is similar to the configuration of FIG. 1, wherein an angle α is provided for configuring train 40 in lateral direction. In order to calculate such a fender a diameter is assumed in a first embodiment of 200 millimeters.

Figure 5:
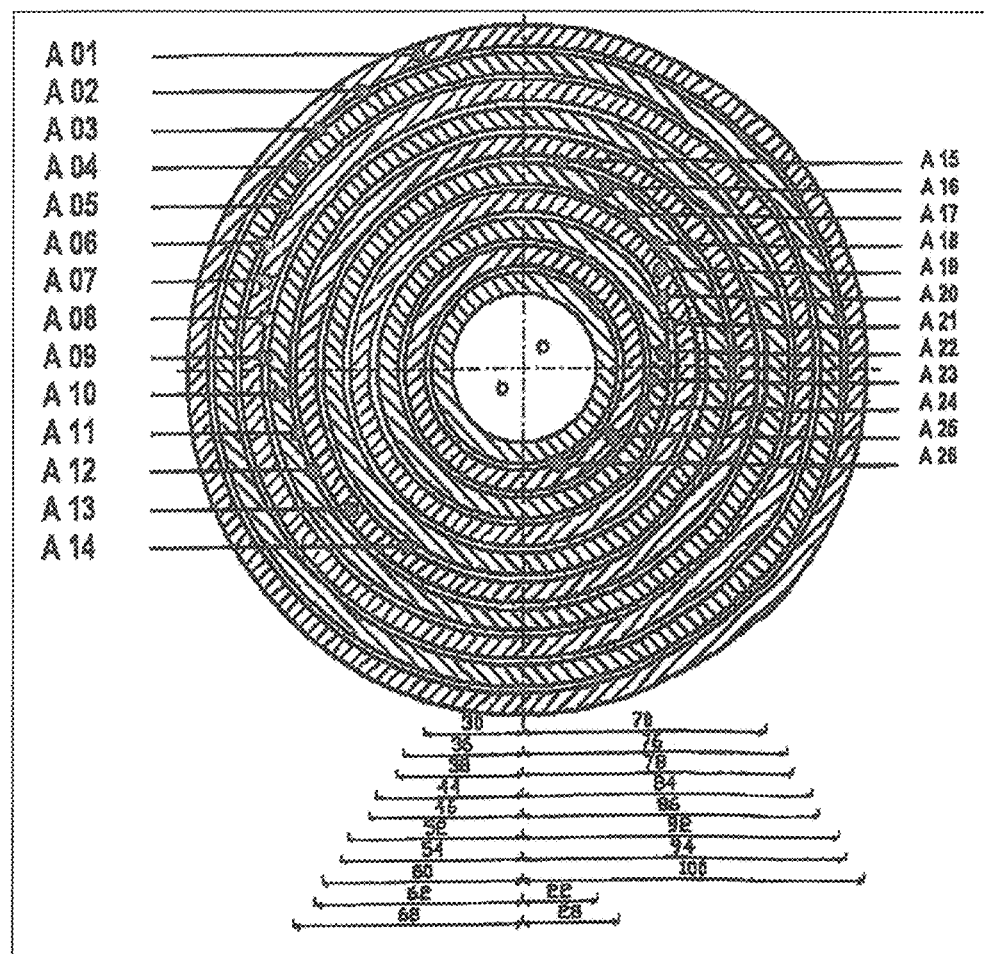
FIG. 5 shows an embodiment of a fender.

The obtained calculation of a fender of Ø 200 mm, constructed from ten 6 mm-wide aluminium rims functioning flexibly relative to each other and at a mutual distance of 2 mm (FIG. 5), was tested. The radii of the rims are successively 22 and 28, 30 and 36, 38 and 44, 46 and 52, 54 and 60, 62 and 68, 70 and 76, 78 and 84, 86 and 92, 94 and 100. With a pressure value in the inner pressure chamber of 10 bar compared to the pressure value of 1 bar in a fender with a single rim (here the pressure value in the outer annular chamber) the load-bearing capacity of this fender (1,346 kg) increased by a multiplication coefficient of ≈4.65 compared to the load-bearing capacity of the fender with a single rim (297 kg). As shown in the graph (FIG. 6, dots representing load-bearing capacity in kg and bars representing pressure value in kPa for the rings), owing to the minimal dimensions of the inner three pressure chambers the contribution of these three rims was found to be very minimal.

The above results, and particularly the marginal contribution of the three inner rims, indicate that if the size of the fender is increased the multiplication coefficient would increase further. A similar calculation was therefore carried out for a fender of Ø 600 mm. The multiplication coefficient was found to have increased to ≈13.5×. This is therefore 2.9 times the multiplication coefficient of the fender diameter of 200 mm.

The greater the diameter of the fender, the greater this multiplication coefficient will therefore be. Looking at the ratio of the load-bearing capacities of the two fenders of diameter 200 mm (1,346 kg) and diameter 600 mm (36,483 kg) filled almost wholly with rims, respectively 10 and 30 rims, there is found to be a very interesting outcome. The ratio of the load-bearing capacities is ≈27× while the ratio of the surface areas of the fenders is 9×, so ≈3 times greater.

Extrapolation means that the fender with diameter 800 mm with 40 rims and so a surface area of 16× the surface area of the fender with diameter 200 mm will have 4×16=64 times the load-bearing capacity of this fender, therefore a load-bearing capacity of ≈175 tons. Or, converted to the weight of the train of ≈20 tons and the use of 4 fenders of Ø 800 mm, a low pressure of ≈0.03 bar in the outer rim (with a limited flow rate Q of 1.4 l/min and little wear of the rims) will be sufficiently high to support the train therewith.

The above extrapolation is considered in the second embodiment.

Stepwise calculation of load-bearing capacity, from outside to inside with the addition of a ring at a time, starting from a pressure value in the outer annular chamber of 1 bar, results in:

0. atmospheric 0 kg, Difference between 0 and 1: 297 kg

1. A1×0.5 bar+A2×1 bar=37 cm$^2$×0.5 kg/cm$^2$+278 cm$^2$×1 kg/cm$^2$=18.5 kg+278 kg=297 kg, Difference between 1 and 2: 249 kg 2. 18.5 kg+A3×1 bar+A4×1.5 bar+A5×2 bar=18.5 kg+12 kg+51 kg (=81.5 kg)+464 kg=546 kg, Difference between 2 and 3: 208 kg 3. 81.5 kg+A6×2 bar+A7×2.5 bar+A8×3 bar=81.5 kg+22 kg+77.5 kg (=181 kg)+573 kg=754 kg, Difference between 3 and 4: 171 kg 4. 181 kg+A9×3 bar+A10×3.5 bar+A11×4 bar=181 kg+30 kg+98 kg (=309 kg)+616 kg=925 kg, Difference between 4 and 5: 133 kg 5. 309 kg+A12×4 bar+A13×4.5 bar+A14×5 bar=309 kg+36 kg+108 kg (=453 kg)+605 kg=1058 kg, Difference between 5 and 6: 103 kg 6. 453 kg+A15×5 bar+A16×5.5 bar+A17×6 bar=453 kg+40 kg+116 kg (=609 kg)+552 kg=1161 kg, up to and including rim 6 provides 86.3% of the maximum load-bearing capacity. Difference between 6 and 7: 76 kg 7. 609 kg+A18×6 bar+A19×6.5 bar+A20×7 bar=609 kg+42 kg+124 kg (=775 kg)+462 kg=1237 kg, up to and including rim 7 provides 91.9% of the maximum load-bearing capacity. Difference between 7 and 8: 53 kg 8. 775 kg+A21×7 bar+A22×7.5 bar+A23×8 bar 775 kg+35 kg+120 kg (=930 kg)+360 kg=1290 kg. Difference between 8 and 9: 35 kg 9. 930 kg+A24×8 bar+A25×8.5 bar+A26×9 bar=930 kg+32 kg+111 kg (=1073 kg)+252 kg=1325 kg. Difference between 9 and 10: 21 kg 10. 1073 kg+A27×9 bar+A28×9.5 bar+A29×10 bar=1073 kg+27 kg+95 kg(=1196 kg)+150 kg=1346 kg.

Figure 6:
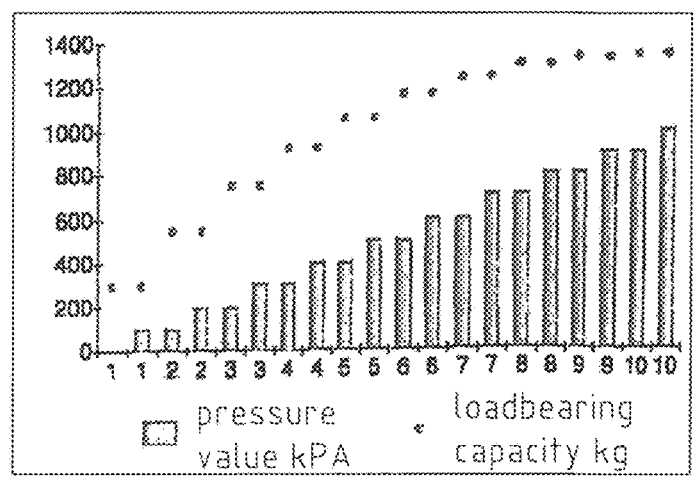
FIG. 6 shows a representation of experimental results with the fender of FIG. 5.

The results obtained and above shown are plotted in FIG. 6. The maximum pressure value in the rigid single fender was found to amount in a practical test to about 0.45 bar. The above stated results must therefore be compensated with a correction factor so that the maximum load-bearing capacity must be 0.45×1346 kg=605 kg.

The load-bearing capacity of this multiple fender: 605 kg/(133.4 kg (see also FIG. 7))=4.53× the load-bearing capacity of rigid fender.

Fender with 7 rings: (0.45 (bar)×1237 kg=) 557 kg/(133.4)=4.17×

Fender with 6 rings: (0.45 (bar)×1161 kg=) 522 kg/(133.4)=3.9×

On the basis of this latter embodiment 20,000 kg/522 kg=38.3: therefore 40 of these fenders would be necessary for the train (or 80 fenders with a pressure value of 0.45 bar×(38.3/80=) 0.215 bar in the outer annular chamber with load-bearing capacity of about 260 kg each, or 160 fenders with a pressure value of 0.108 bar in the outer annular chamber with a load-bearing capacity of about 130 kg each).

Figure 7:
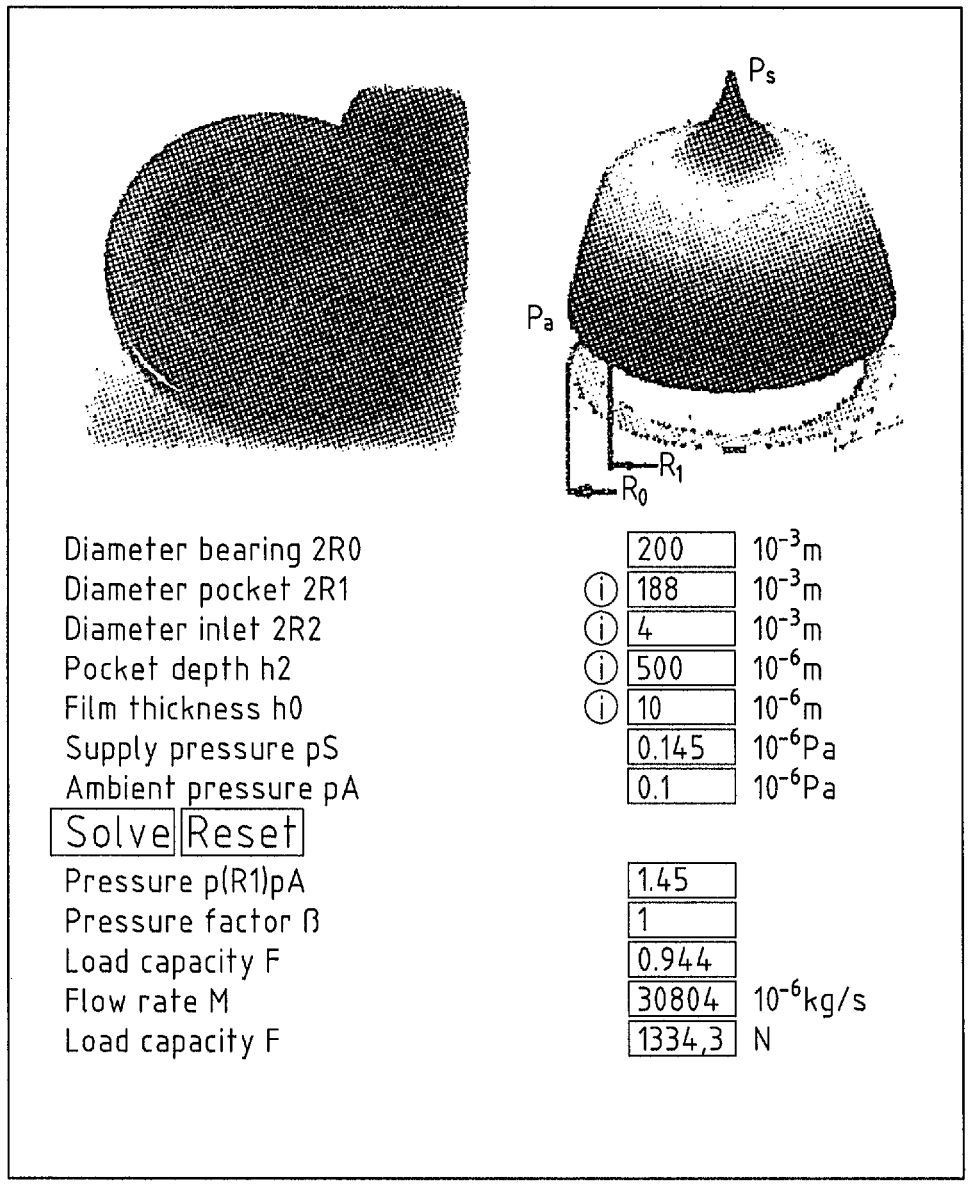
FIG. 7 shows a representation of results with the fender of FIG. 5.

FIG. 7 and table 1 show visually the obtained results of a number of embodiments.

TABLE 1

| Setting | FIG. 7 |
| --- | --- |
| Diameter bearing 2R0 | 200 $10^{-3}$ m |
| Diameter pocket 2R1 | 188 $10^{-3}$ m |
| Diameter 2R2 | 4 $10^{-3}$ m |
| Pocket depth h2 | 500 $10^{-6}$ m |
| Film thickness h0 | 10 $10^6$ m |
| Supply pressure pS | 0.145 $10^6$ Pa |
| Ambient pressure pA | 0.1 $10^6$ Pa |
| Result | |
| Pressure p(R1)/pA | 1.45 |
| Pressure factor β | 1 |
| Load-bearing capacity F | 0.944 |
| Flow rate M | 30804 $10^{-6}$ kg/s |
| Load-bearing capacity F | 1334.3N |

Figure 8:
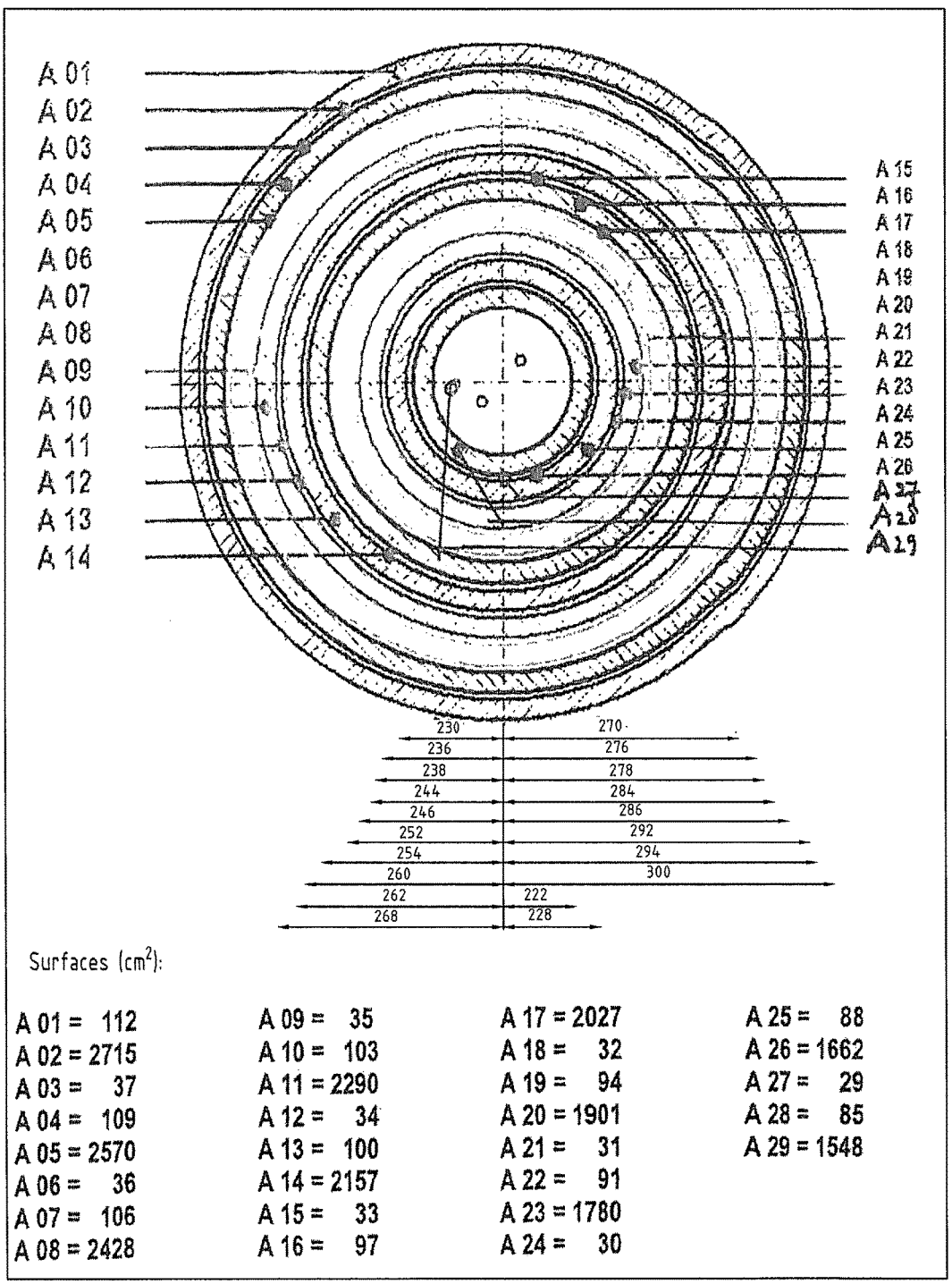
FIG. 8 shows a view of an alternative embodiment of a fender according to the invention.

In a second embodiment experiments were performed in similar manner. The configuration is shown in FIG. 8, with radii for the individual rims of 222 and 228, 230 and 236, 238 and 244, 246 and 252, 254 and 260, 262 and 268, 270 and 276, 278 and 284, 286 and 292, 294 and 300. Surface areas in $cm^2$ are for A01 112, A02 2715, A03 37, A04 109, A05 2570, A06 36, A07 106, A08 2428, A09 35, A10 103, A11 2290, A12 34, A13 100, A14 2157, A15 33, A16 97, A17 2027, A18 32, A19 94, A20 1901, A21 31, A22 91, A23 1780, A24 30, A25 88, A26 1662, A27 29, A28 85, A29 1548.

Stepwise calculation of load-bearing capacity (from outside to inside with the addition of a ring at a time), starting from a pressure value in the outer annular chamber of 1 bar:

1. A1×0.5 bar+A2×1 bar=112 $cm^2$×0.5 $kg/cm^2$+2715 $cm^2$×1 $kg/cm^2$ (=56 kg)+2,715 kg=2,731 kg, difference between 1 and 2: 2,626 kg 2. 56 kg+A3×1 bar+A4×1.5 bar+A5×2 bar=56 kg+37 kg+164 kg (=257 kg)+5,140 kg=5,397 kg, difference between 2 and 3: 2,481 kg 3. 257 kg+A6×2 bar+A7×2.5 bar+A8×3 bar=257 kg+72 kg+265 kg (=594 kg)+7,284 kg=7,878 kg, difference between 3 and 4: 2,341 kg 4. 594 kg+A9×3 bar+A10×3.5 bar+A11×4 bar=549 kg+105 kg+360 kg (=1,059 kg)+9,160 kg=10,219 kg, difference between 4 and 5: 2,211 kg 5. 1,059 kg+A12×4 bar+A13×4.5 bar+A14×5 bar=1,059 kg+136 kg+450 kg (=1,645 kg)+10,785 kg=12,430 kg, difference between 5 and 6: 2,076 kg 6. 1,645 kg+A15×5 bar+A13×5.5 bar+A14×6 bar=1,645 kg+165 kg+534 kg (=2,344 kg)+12,162 kg=14,506 kg, difference between 6 and 7: 1,948 kg 7. 2,344 kg+A18×6 bar+A19×6.5 bar+A20×7 bar=2,344 kg+192 kg+611 kg (=3,147 kg)+13,307 kg=16,454 kg, difference between 7 and 8: 1,832 kg 8. 3,147 kg+A21×7 bar+A22×7.5 bar+A23×8 bar=3,147 kg+217 kg+682 kg (=4,046 kg)+14,240 kg=18,286 kg, difference between 8 and 9: 1,706 kg 9. 4,046 kg+A24×8 bar+A25×8.5 bar+A26×9 bar=4,046 kg+240 kg+748 kg (=5,034 kg)+14,958 kg=19,992 kg, difference between 9 and 10: 1,590 kg 10. 5,034 kg+A27×9 bar+A28×9.5 bar+A29×10 bar=5,034 kg+261 kg+808 kg (=6,102 kg)+15,480 kg=21,582 kg.

Otherwise assuming that the mutual differences between the load-bearing capacity of adjacent rims amount to an average "factor of increase in the difference" of 0.92×, the difference values for the rest of the calculation would amount to:

10-11: 1463 kg 16-17: 816 kg 22-23: 495 kg 28-29: 300 kg 11-12: 1345 kg 17-18: 750 kg 23-24: 455 kg 29-30: 276 kg 12-13: 1240 kg 18-19: 690 kg 24-25: 419 kg 30-31: 254 kg 13-14: 1139 kg 19-20: 635 kg 25-26: 385 kg 31-32: 233 kg 14-15: 1048 kg 20-21: 549 kg 26-27: 354 kg 32-33: 214 kg 15-16: 964 kg 21-22: 538 kg 27-28: 326 kg 33-34: 198 kg 34-35: 182

Area inner chamber (Ø 4.4 cm; P=35 bar)=15.2 $cm^2$: contribution of inner chamber to the total load-bearing capacity: 532 kg.

Total load-bearing capacity: 37,382 kg.

Figure 9:
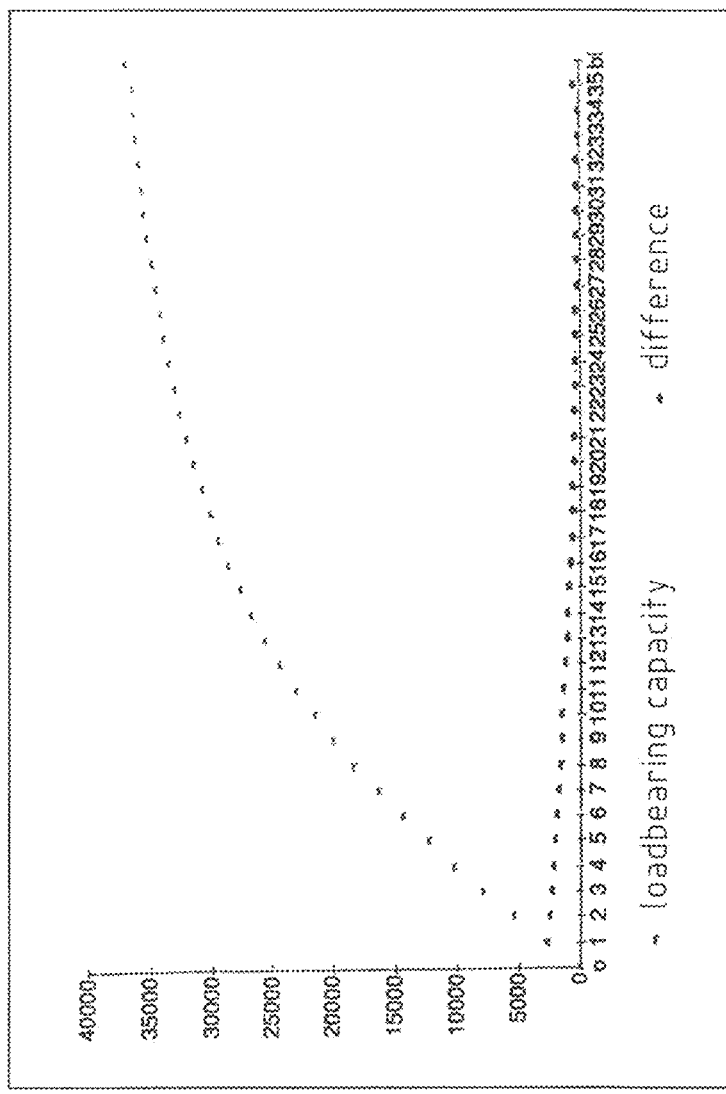
FIG. 9 shows a representation of experimental results with the embodiment of the fender of FIG. 8.

The results obtained are shown in FIG. 9 with the upper line showing the load-bearing capacity in kg and the lower line the difference between adjacent rims.

Figure 10:
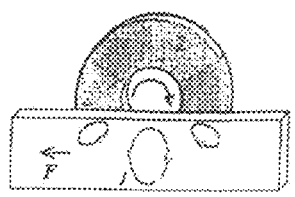
FIG. 10 shows a conceptual representation of the drive according to the invention.

A possible embodiment of the drive according to the invention is further described and shown in FIG. 10.

In the shown embodiment the drive according to a first version, used for a train for the purpose of bogie 2, comprises an electric motor based on utilization of the Lorenz forces, preferably in aluminium strips functioning as conductor. In such a motor a source, formed in an advantageous embodiment with a permanent magnet or magnets, causes a magnetic field through a conductive circuit. An electric current is induced in the circuit by changing the magnetic field, preferably of the magnet which moves relative to this circuit. The Lorentz force between the magnetic field and the current is manifested as a force between the permanent magnet and the conductive circuit which decelerates the permanent magnet and entrains the conductive circuit with the movement of the magnet. A drive can be realized in this manner.

By mounting permanent magnets on a wheel which is fixed to the vehicle and then allowing this wheel to rotate along a guiding beam (FIG. 10) we also obtain the qualitative effects described in the previous paragraphs. The vehicle will exert a force on the beam and be accelerated by the reaction force. This system thus forms in principle a motor. If however we wish to answer quantitative questions, we are confronted with a number of significant differences between the magnetic wheel/guiding rail combination and the theoretical example of the previous paragraph.

Firstly, there are the magnets themselves: the magnetic field around a permanent magnet does not change abruptly from zero to a constant value, as in the wire frame example, but is a continuously varying function of the position. Then there is the guiding rail: in the wire frame example the electric current is forced to flow in a circuit with imposed geometry, and spatial integrals, such as in Faraday's law, can thereby be calculated relatively easily. In a full guiding rail the eddy current will continuously form extended and more complex patterns, especially on the top side of the rail (FIG. 10) where the current is 'forced' to reverse in order to remain in the rail.

Figure 2:
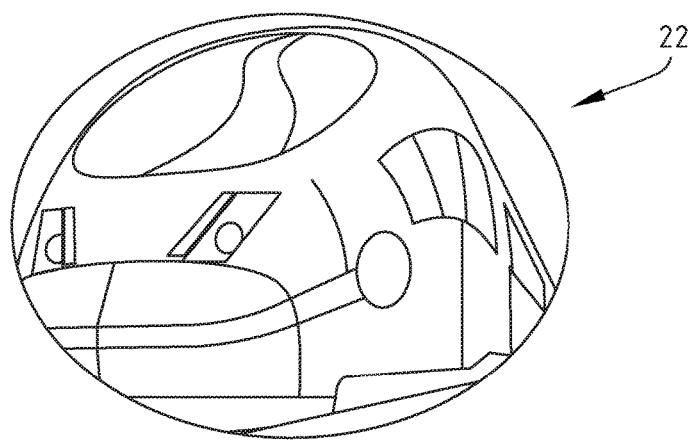
FIG. 2 shows a train provided with such a bogie.
Figure 11:
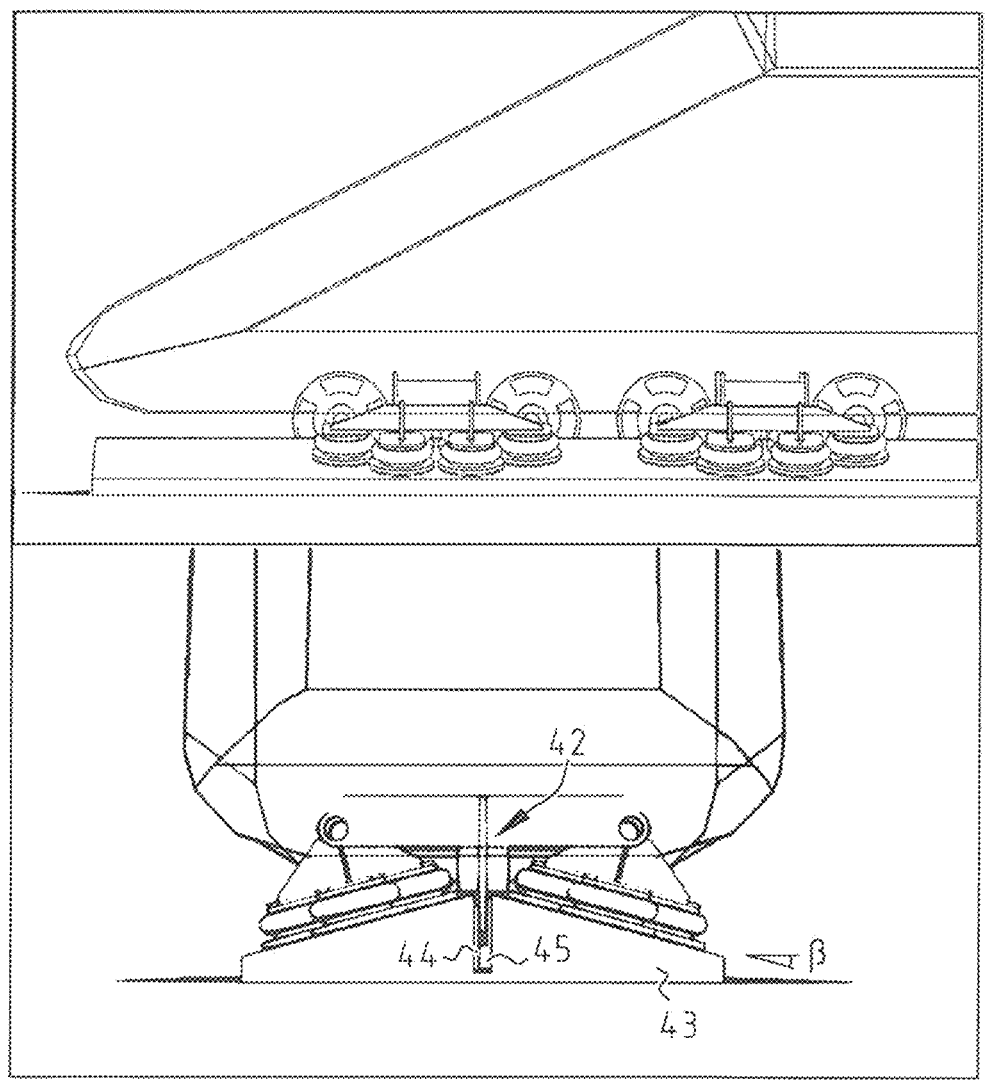
FIG. 11 shows a view of a drive and a suspension of a bogie of the train of FIG. 2.

The drive and the positioning relative to the suspension of the levitating train is further shown in FIG. 11 and FIG. 1.

In the shown embodiments use is made of magnetic wheels with a diameter of 200 millimeters, and in an alternative embodiment with a diameter of 60 or 600 millimeters.

It is noted that the drive can also be applied without the fender according to the invention. The invention thus also relates to the drive separately. In FIG. 11 drive 42 is provided centrally in track 43. Guiding strip 44 is provided in recess 45. Angle β is provided for lateral fixation.

In addition, it is noted that the drive can also be used in other applications, such as a wind turbine. The drive can for instance also be applied as generator.

Figure 12A:
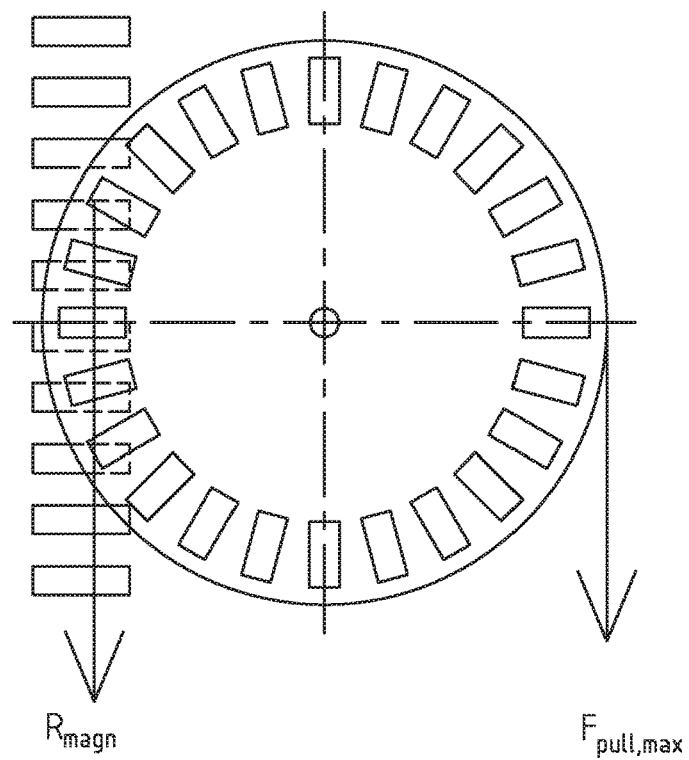
FIGS. 12A, 12B, and 13 show a view of a test setup of the drive.
Figure 12B:
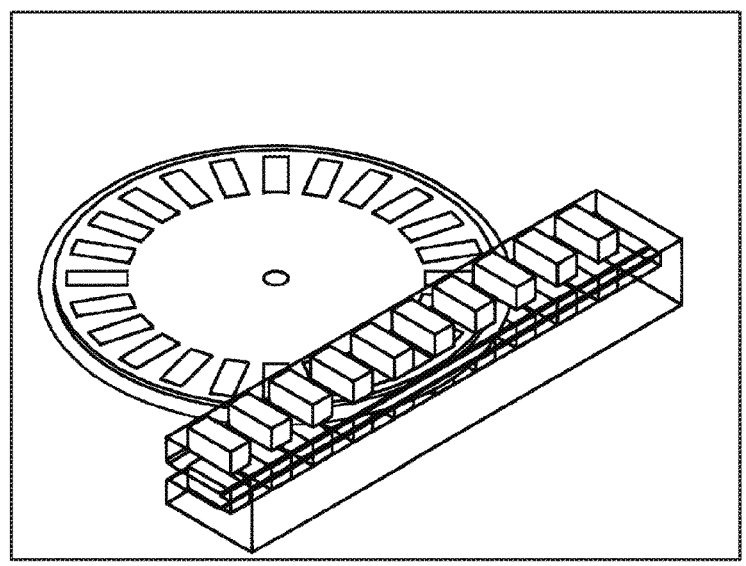
Figure 13:
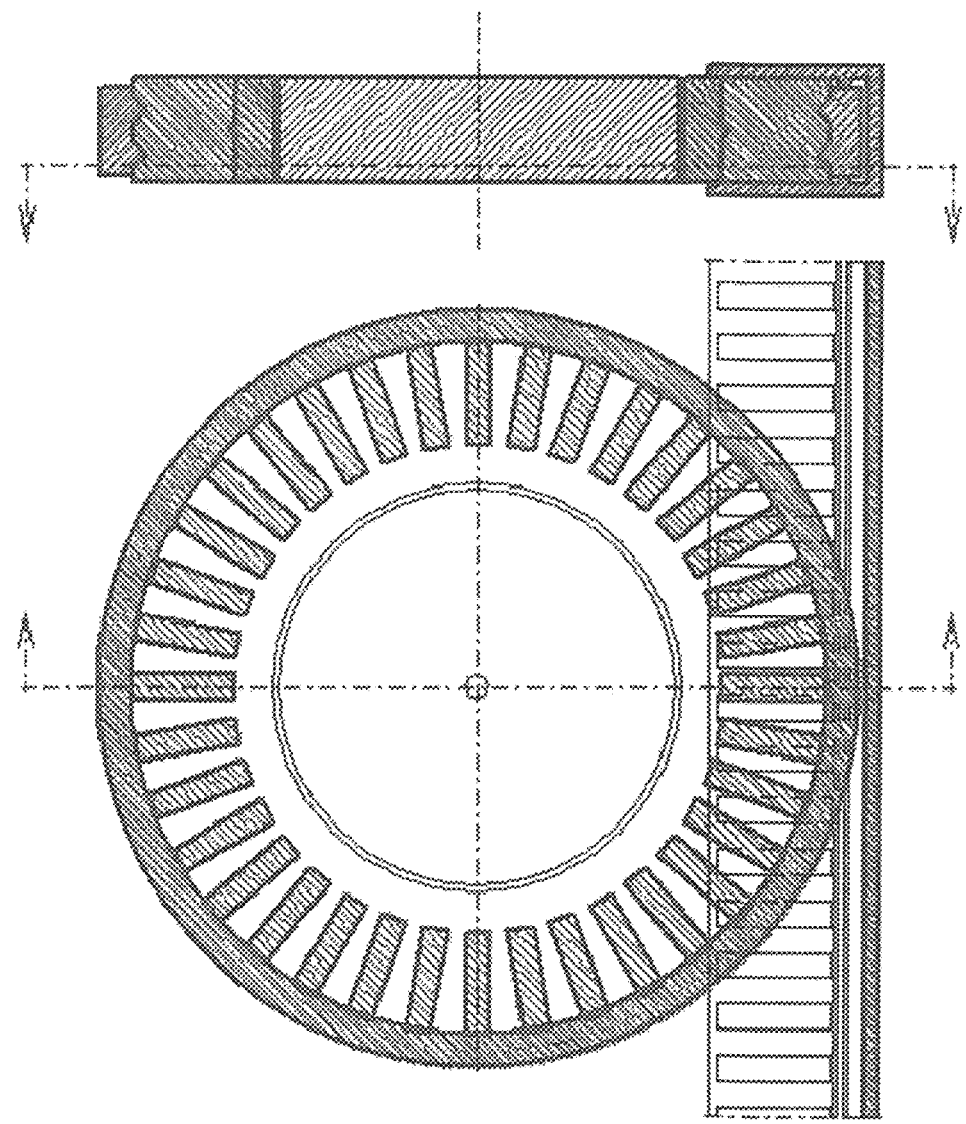

A second embodiment of the drive is shown in FIGS. 12A, 12B, and 13.

The use of permanent magnets for driving and braking the train is further elucidated below. The super-strong Neodymium permanent magnets were found to be highly suitable for this purpose. The use of this type of magnet could present the possibility of hereby being able to develop sufficient traction and braking power to allow optimal operation of the APT train.

Apart from the relatively limited availability of this earth metal, the costs of applying these magnets in the track would have an adverse effect on efforts to keep infrastructure investment costs as low as possible. During the research into the practical applicability of these magnets in combination with steel strips, it was found that, if such a magnet was positioned displaceably at a short distance of about 1 mm between two steel strips with corresponding orifices, the magnet had to be pulled with a relatively great traction force in order to draw this magnet past those orifices. Calculation of this force in relation to the estimated drive power of the train gave sufficient cause to voice the expectation that utilization of this phenomenon could well be sufficient to develop a contactless driving technique on the basis thereof. Particularly having to arrange only steel blocks in the guide construction of the track would bring about only a limited increase in costs of the track. After carrying out traction tests with a constructed test setup for indicative determination of the dimensioning of the ideal ratio of the size of the steel strips and that of the magnet and the effect on the mutual distances, a first semi-rotating test setup was developed and constructed (see FIGS. 10 and 11). The tests performed herewith showed that the transferable torque was high enough to be able to assume that, using this technical option, an adequate solution for developing a low-friction driving technique could indeed be a/possibility. The calculation of a graphic representation of this test setup gave sufficient insight into a possibly feasible dimensioning of such a type of driving technique.

The above discussed version of the technique has shown that a directly engaging, contactless transmission can be realized with this technique. It is the case that the first version functions optimally when there is a speed difference of 3.5 m/sec between the magnetic disc and the aluminium strips arranged here in the track construction. In order to gain more insight into the possible added value this transmission technique could produce, a second embodiment of this technique has been developed in a rotating version. The tests performed with this second version mounted on the turning device were found to produce a transferable torque of 4.5 Nm similar to that already obtained during previous stationary tests and calculations made ($\approx 5$ Nm). From the experience gained with and the knowledge developed from applying air bearing, the rotating version was subsequently provided with an air bearing between the magnetic disc and a single larger disc provided with iron cores. This appears to confirm that reducing the distance between the discs results in an increase in the transferable torque. In the previous tests there was a two-sided version. This latter setup however had a single version. A maximum transferable torque of 6.6 Nm was hereby measured. This is comparatively almost a tripling of the torque value.

Finally, this test was also performed with an aluminium disc in the turning device. The measured torque value was found to amount to $\approx 5$ Nm.

With the setup of FIGS. 12A and 12B a number of parameters were determined for this embodiment. These are:
Maximum traction force ($F_{trek,max}$) about 19 kgf
magnetic resistance about 0.7 kgf
effective traction force about 18 kgf.
Magnetic resistance ($R_{magn}$): 150/118 mm×18 kgf about 24 kgf
Required maximum force for acceleration Aquatrain about 26 KN=2600 kgf: Per drive wheel: 650 kgf=650/24, therefore 27-fold force compared to results of test setup.
Magnets applied in test setup: 10×15×35 mm.
Dimensioning magnets Aquatrain>>3× the dimensioning: 30×50×100 mm.
Weight drive wheel:
24 magnets×150 cm$^3$=3.6 dm$^3$=3.6×7.8 kgf>>28 kg.
Aluminum disc Ø 900 mm×30 mm: >>20 dm$^3$×2.7 kg>>54 kg
Including bearings: >>100/150 kg.
Magnets 6×10×20 (I=1200 mm$^3$): ratio with 10×15×35 (I=5250 mm$^3$)=1200/5250=23%
F could be 0.23×19>>4 kgf.
Moment=4 kgf×0.15 m=0.6 kgfm=6 Nm.

A further test was performed with an setup as shown in FIG. 13. The test has shown in respect of the generable drive power that, on the basis of above stated video recorded test with a magnet package of two upright magnets of 40×40×10 mm, a traction force of about 7 kgf can be utilized as drive power in a similar configuration via the substantially contactless structural engagement on a guide as part of a track construction, for instance for the Aqua Planing Train. With these magnets a usable magnetic field could only be utilized on one side, while a magnetic field can be utilized on two sides via the above configuration of the magnets applied here. This is optionally even possible for three sides.

In the above technical development the following drive power can be generated per drive wheel on the basis of this value of 7 kgf:

A magnet of 80×80×20 mm has an eight-fold volume compared to a magnet of 40×40×10 mm and therefore an eight-fold generable traction power. This is thus a generable traction force per magnet which can be generated of 8×7 kgf=56 kgf. This outcome is thus the value generated by this magnet over two sides during load and is as such eight-fold the value of the traction force of 7 kgf which could be generated by 2 magnets of 40×40×10 mm in the test setup.

In this further development there is always a wholly or partially active number of magnets of nine per wheel for generating the drive power. When converted, the traction value of these nine magnets is comparable to four fully loaded magnets (sum of the positive and negative active parts), so a generable traction force of 4×56 kgf=224 kgf per wheel.

Per set of two drive wheels in a double-sided drive: 448 kgf.

Figure 14:
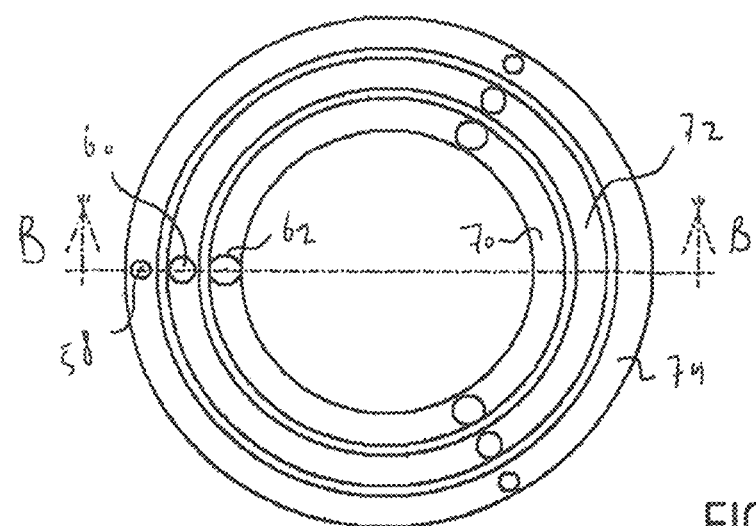
FIGS. 14 and 15 show a further embodiment of the fender according to the invention.
Figure 15:
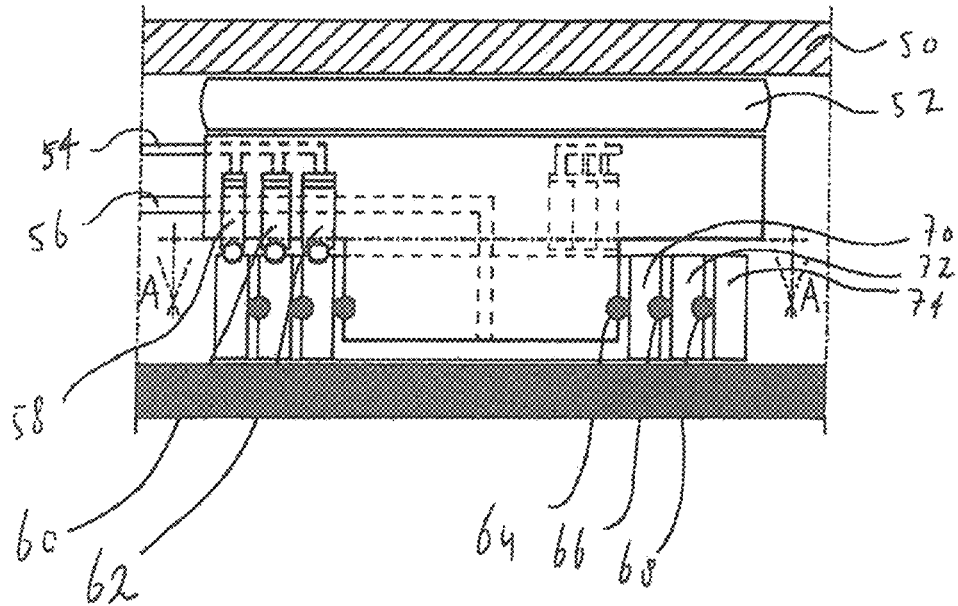

A further embodiment of the fender embodied in this case with a three-fold rim is constructed from rims in the form of three rings which are manufactured from a metal or from a rigid or flexible plastic, or a combination hereof, and which are provided relative to each other and to the construction of the fender with an airtight connection via arrangement of in this case rubber O-rings 64, 66, 68 (FIGS. 14 and 15).

All three rims 70, 72, 74 are each actuated from the fender construction by three hydraulic or pneumatic cylinders 58, 60, 62. In this embodiment compressed air pressure with a pressure value of for instance 3 bar is applied in the inner pressure chamber. By increasing the diameter of the arranged cylinders per rim, as seen from the outside to the inside, such that this dimensioning will correspond to the vertical upward forces which are exerted on these rims and increase from outside to inside and which are exerted by the air pressure present under these rims. This achieves that in this case one hydraulic value can be employed in the cylinders. In the case of an increase or decrease in the force or load exerted on the fender construction, the single feed of the air pressure and the, in this embodiment, likewise single feed of the hydraulic pressure corresponding to the value of the exerted force or load hereby has to be regulated with the purpose in this embodiment of allowing the pressure value in the air chambers to increase, as seen from the outside to the inside, from for instance 1 bar in the outer annular chamber to 2 bar in the inner annular chamber and to 3 bar in the inner pressure chamber.

For an optionally smoother functioning of this embodiment an air cushion construction 52 can be arranged between the fender construction and for instance the train construction 50. The air pressure operating herein will also have to be regulated corresponding to the value of the varying force or load exerted on the fender.

Figure 16:
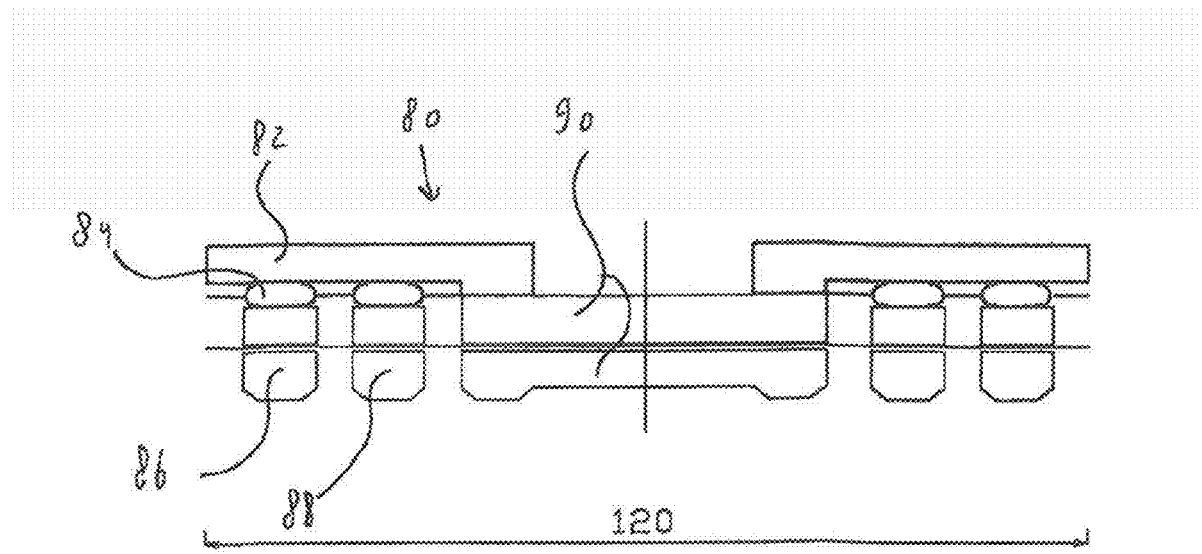
FIGS. 16 and 17 show respectively a cross-section and a view of a rigid fender with two flexible rims according to the invention.
Figure 17:
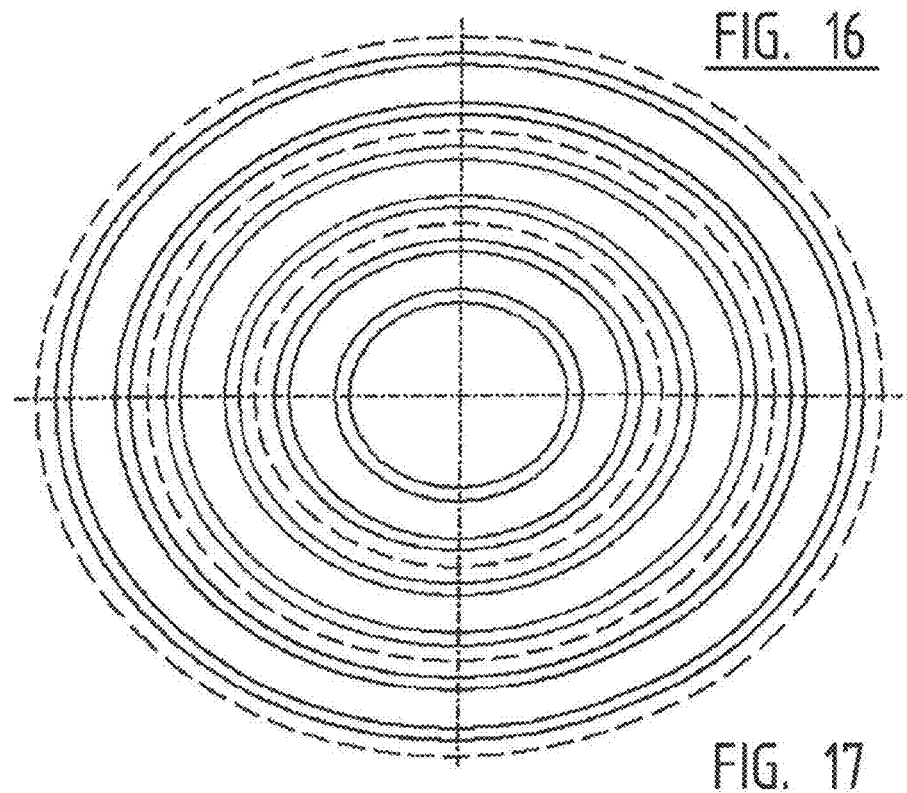
Figure 18:
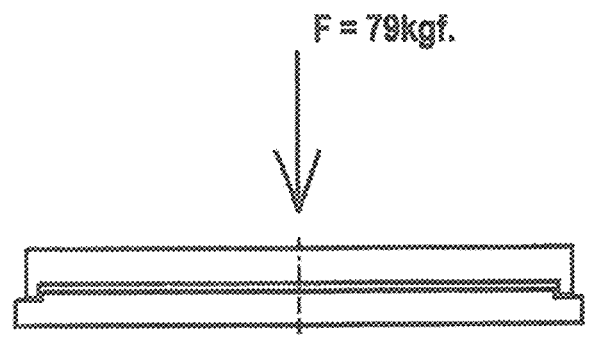
FIGS. 18-23 show diverse figures and results relating to a test with a plastic duo-fender with a diameter of 160 mm and a thickness of 10 mm.
Figure 19:
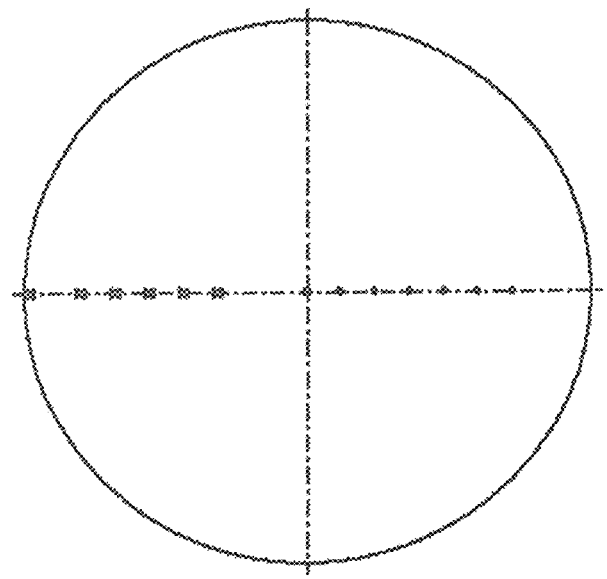
Figure 20:
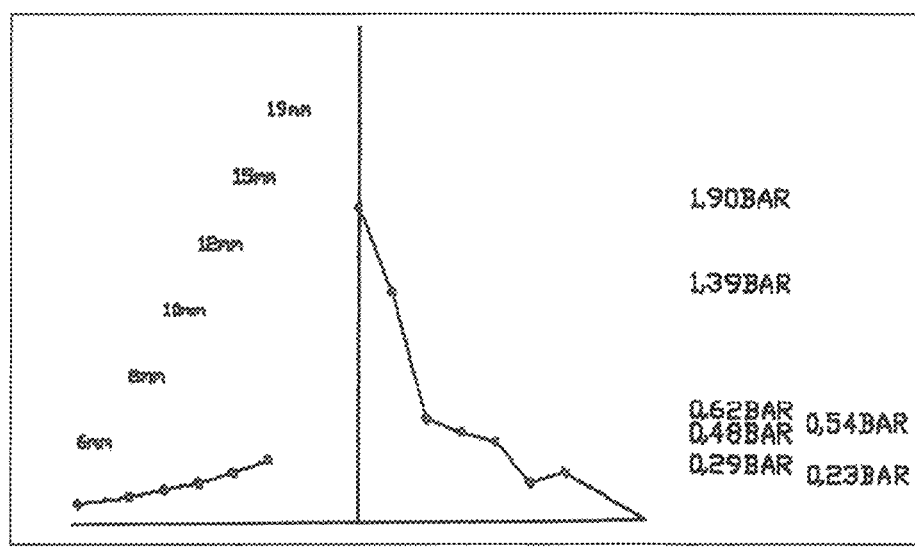

FIGS. 16 and 17 show an embodiment of a rigid fender 80 with two flexible rims. FIG. 17 is shown as representation in oval/elliptical form, while it will be appreciated that in reality it is circular. Provided here are: rigid part 82, air chamber 84 for actuating flexible rims 86, 88. Further shown are rigid fender parts 90.

FIGS. 18-27 show diverse Figures and results in respect of a test with a plastic duo-fender. Use is made here of the following parameters:

Supply pressure: 2 bar;
$P_{cylinder}$: 2.5 bar;
$A_{cylinder}$ Ø63: 31.7 cm$^2$;
F≈79 kgf.

Total weight train: 20 tonf; 4 fenders: 5,000 kgf/fender:
Number of fenders Ø 16 cm required: 5,000 kgf/79 kgf≈64 fenders. Therefore necessary for scaling-up:
√64=8×: Ø128 cm.

Air consumption fender Ø 16 cm: tank 24 liters, 8 to 2 bar: 96 liters (2 bar) in 4 minutes=24 liters (2 bar)/minute=1.44 m$^3$/hour.

Increase circumference in scaling-up: 8×. Anticipated air consumption per fender: 8×1.44 m$^3$≈11.5 m$^3$. Anticipated air consumption train: 4×11.5 m$^3$=46 m$^3$/hour.

Figure 21:
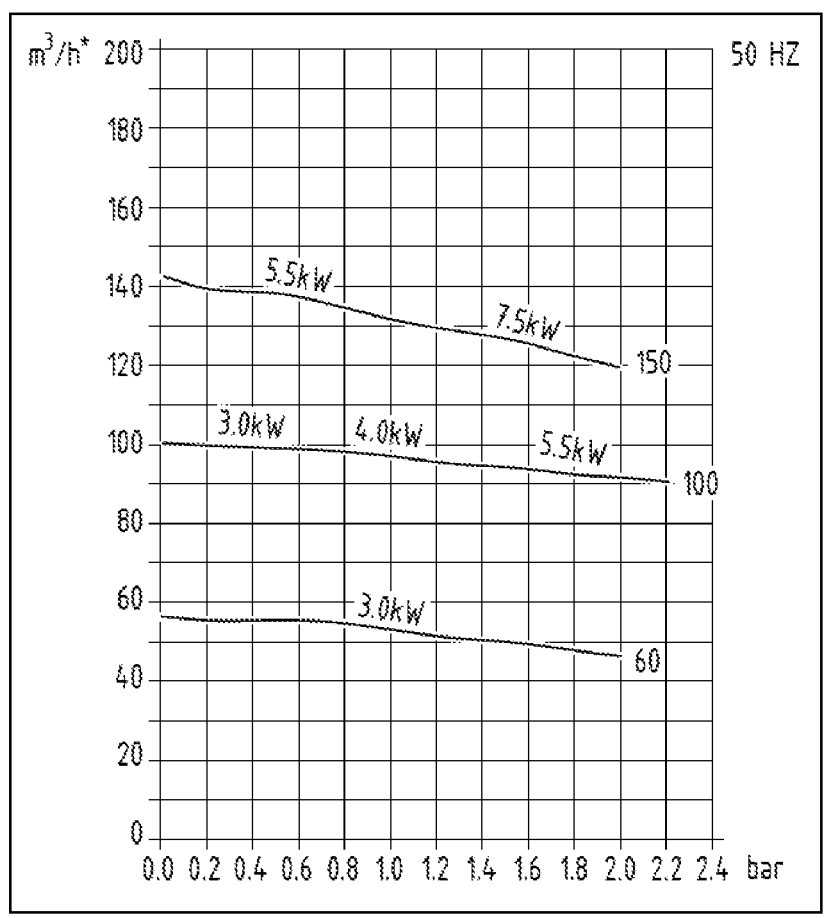
Figure 22:
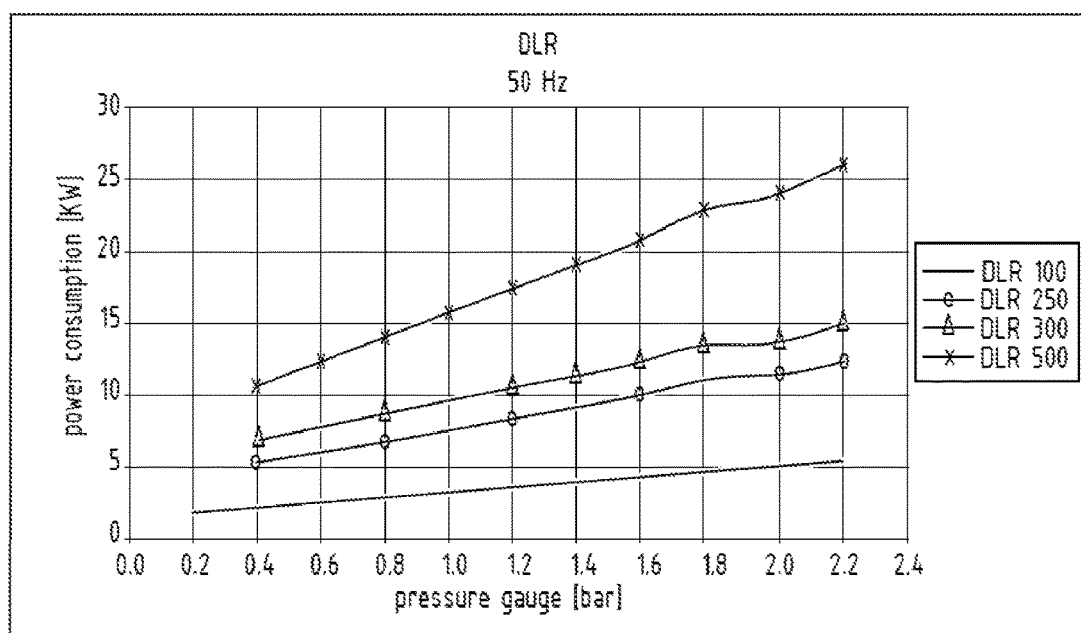

At a pressure of 2 bar DRL 100 requires a power of 5 kW and produces 89 m$^3$ of air (see also FIG. 21 with the bottom line for DLR 80, middle line for DRL 100 and top line for DLR 150 for air output in m$^3$/hour relative to overpressure in bar, and FIG. 22 with bottom line for DLR 100, above this DLR 250, DLR 300 and at the top DLR 500 for power in kW relative to overpressure in bar).

Total electricity consumption for the whole train: 46 m$^3$/89 m$^3$×5 kWh=2.6 kWh.

Figure 23:
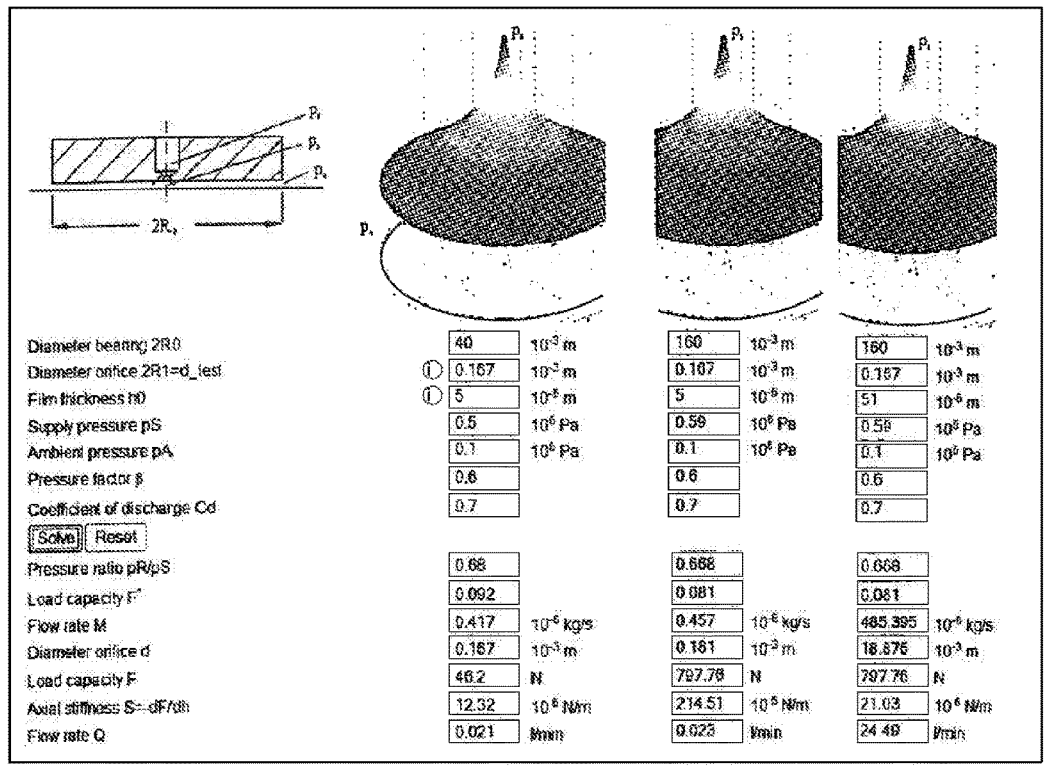
Figure 24:
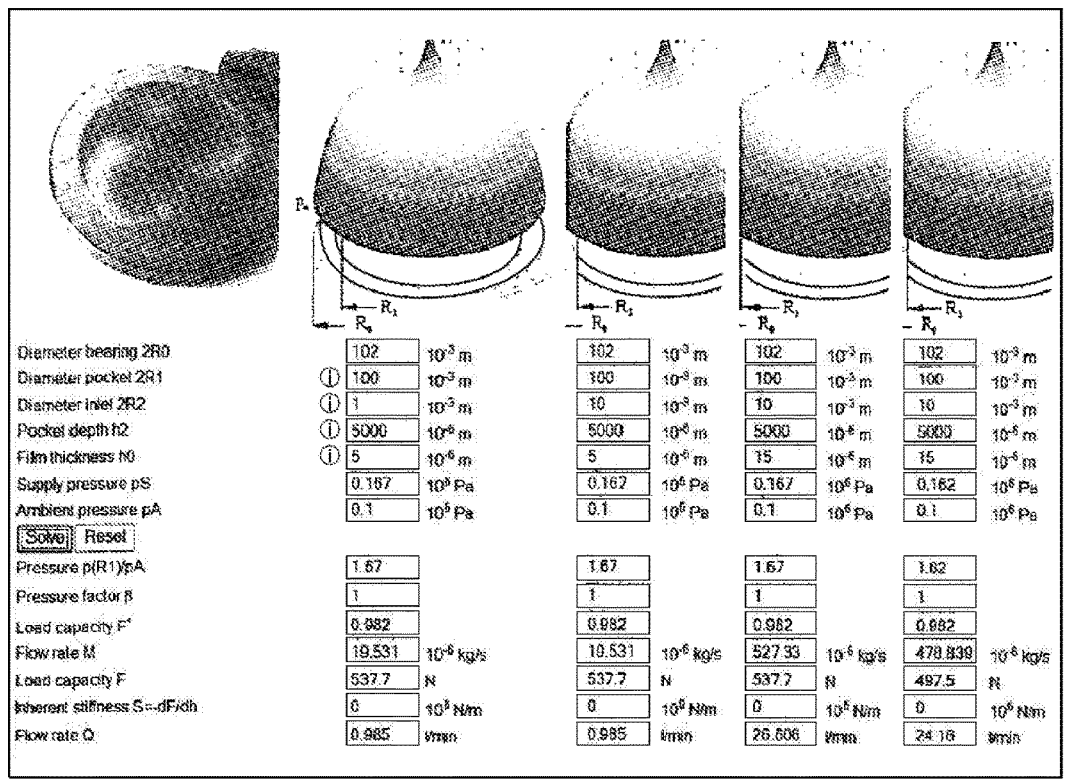
FIGS. 24-27 show diverse figures and results relating to a calculation of the air consumption of a small foil fender.
Figure 25:
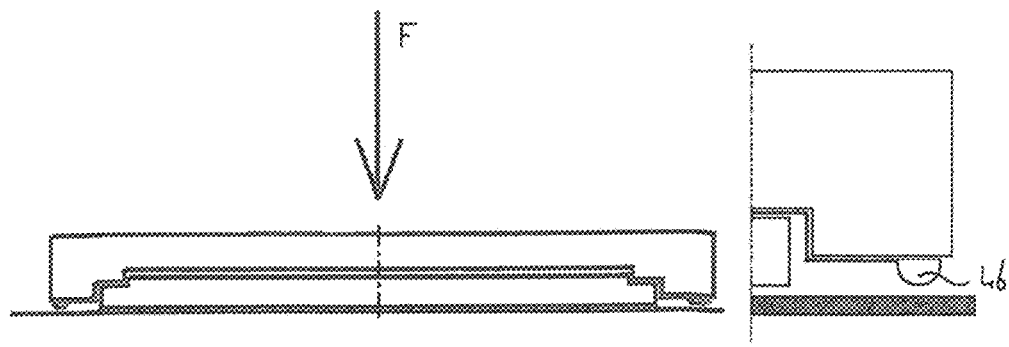
Figure 26:
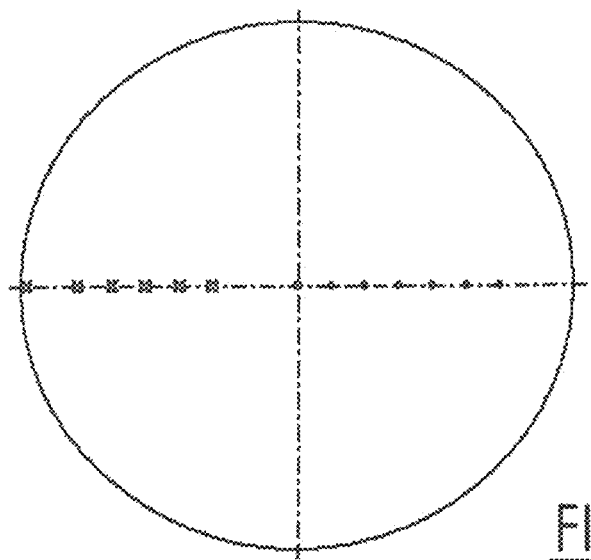

FIGS. 23 and 24 show a number of configurations with parameters and calculated results in tables 2 and 3 respectively.

TABLE 2

| Setting | FIG. 23A | 23B | 23C |
|---|---|---|---|
| Diameter bearing 2R0 | 40 10$^{-3}$ m | 160 10$^{-3}$ m | 160 10$^{-3}$ m |
| Diameter Orifice 2R1 = d_test | 0.167 10$^{-3}$ m | 0.167 10$^{-3}$ m | 0.167 10$^{-3}$ m |
| Film thickness h0 | 5 10$^{-6}$ m | 5 10$^{-6}$ m | 51 10$^{-6}$ m |
| Supply pressure pS | 0.5 10$^6$ Pa | 0.59 10$^6$ Pa | 0.59 10$^6$ Pa |
| Ambient pressure pA | 0.1 10$^6$ Pa | 0.1 10$^6$ Pa | 0.1 10$^6$ Pa |
| Pressure factor β | 0.6 | 0.6 | 0.6 |
| Coefficient of discharge Cd | 0.7 | 0.7 | 0.7 |
| Result | | | |
| Pressure ratio pR/pS | 0.68 | 0.668 | 0.668 |
| Load-bearing capacity F | 0.092 | 0.081 | 0.081 |
| Flow rate M | 0.417 10$^{-6}$ kg/s | 0.457 10$^{-6}$ kg/s | 485.395 10$^{-6}$ kg/s |
| Diameter orifice d | 0.167 10$^{-3}$ m | 0.181 10$^{-3}$ m | 18.876 10$^{-3}$ m |
| Load-bearing capacity F | 46.2N | 797.76N | 797.76N |
| Axial stiffness S = dF/dh | 12.32 10$^6$ N/m | 214.51 10$^6$ N/m | 21.03 10$^6$ N/m |
| Flow rate Q | 0.021 l/min | 0.023 l/min | 24.49 l/min |

TABLE 3

| | FIG. | | | | |
|---|---|---|---|---|---|
| | 24A | 24B | 24C | 24D | |
| Parameters | | | | | |
| Diameters bearing 2R0 | 102 | 102 | 102 | 102 | $10^{-3}$ m |
| Diameter pocket 2R1 | 100 | 100 | 100 | 100 | $10^{-3}$ m |
| Diameter inlet 2R2 | 1 | 10 | 10 | 10 | $10^{-3}$ m |
| Pocket depth h2 | 5000 | 5000 | 5000 | 5000 | $10^{-6}$ m |
| Film thickness h0 | 5 | 5 | 15 | 15 | $10^{-6}$ m |
| Supply pressure pS | 0.167 | 0.167 | 0.167 | 0.162 | $10^6$ Pa |
| Ambient pressure pA | 0.1 | 0.1 | 0.1 | 0.1 | $10^6$ Pa |
| Result | | | | | |
| Pressure p(R1)pA | 1.67 | 1.67 | 1.67 | 1.62 | |
| Pressure factor β | 1 | 1 | 1 | 1 | |
| Load-bearing capacity F | 0.982 | 0.982 | 0.982 | 0.982 | |
| Flow rate M kg/s | 19.531 | 19.531 | 527.33 | 478.839 | $10^{-6}$ |
| Load-bearing capacity F | 537.7 | 537.7 | 537.7 | 497.5 | N |
| Inherent stiffness S = dF/dH | 0 | 0 | 0 | 0 | $10^6$ N/m |
| Flow rate Q | 0.985 | 0.985 | 26.606 | 24.16 | l/min |

Figure 27:
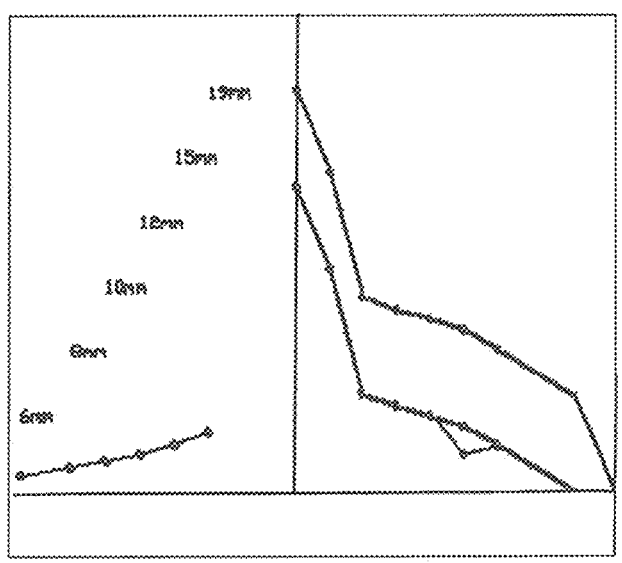

There follows below a calculation of the air consumption of a small foil fender, with reference to FIGS. 24-27, with an additional rim 46. In FIG. 27 the bottom line on the right shows the pressure of the configuration of FIG. 18 and the top line the configuration of FIG. 25. The difference is explained by rim 46. This fender has a Ø 10 cm: A=78 cm². If F large fender Ø 100 cm (A=7800 cm²)=5000 kgf, then F small fender Ø 10 cm is thus 50 kgf, so P air chamber=50 kgf/78 cm²=0.64 bar.
P rim=0.67 bar.
Cylinder Ø 6.3 cm: A=31.7 cm²: F=50 kgf, so P cylinder=50/31.7=1.58 bar.

Air consumption small fender:

From 8 to 2 bar: 12 minutes=4×24 liters=96 liters (2 bar) in 12 minutes (=480 liters (2 bar)/hour)=3×96 liters (0.67 bar)=288 liters (0.67 bar) in 12 minutes=288 liters/12 minutes=24 liters/minute (0.67 bar)=5×288 liters/hour=1.44 m³ (0.67 bar)/hour.

For four fenders of Ø 100 (circumference 10×)=4×10× 1.44 m³ (0.67 bar)/hour=57.6 m³ (0.67 bar)/hour.

At a pressure of 0.67 bar DRL 100 requires a power of 3 kW and produces 97 m³ of air.

Total electrical consumption for the whole train: 57.6 m³/97 m³×3 kWh=1.8 kWh.

For four fenders of Ø 100 (circumference 10×)=4×10× 0.48 m³ (2 bar)/hour=19.2 m³ (2 bar)/hour.

At a pressure of 2 bar DRL 100 requires a power of 53 kW and produces 89 m³ of air.

Total electrical consumption for the whole train: 19.2 m³/89 m³×5 kWh=1.08 kWh.

Results considered on the basis of the air bearings calculation method:

For the test setup with cylinders Ø 63 mm: A=31.7 cm²; F=50 kgf: P=50 kgf/31.7 cm²=1.58 bar.

Air feed (diameter inlet not important) on the meter: 0.67 bar and in the rim 0.62 bar.

A film thickness of 15 microns is found to apply for a consumption of 24 liters/minute.

The present invention is by no means limited to the above described embodiments thereof. The rights sought are defined by the following claims, within the scope of which many modifications can be envisaged. The described and shown drive can thus be used for instance separately of the fenders, for instance in wind turbines.

The invention claimed is:

1. A fender, comprising:
   a support surface provided on the underside;
   an inner pressure chamber provided in or on the support surface;
   a feed arranged in the pressure chamber for feeding a fluid;
   at least two rims concentrically positioned around the inner pressure chamber, each of the at least two rims comprising a ring with a respective actuable annular air chamber positioned above the ring, each of the at least two rims being provided with a respective feed channel,
   wherein at least part of each of the at least two rims is flexible,
   wherein fluid flows laterally outward from the inner pressure chamber toward an outermost one of the at least two rims; and
   a connection with which the fender is fixed in a horizontal direction.

2. The fender as claimed in claim 1, wherein the fluid comprises air.

3. The fender as claimed in claim 1, wherein the respective feed channel for each of the at least two rims feeds the fluid to the respective actuable annular air chamber positioned above the ring.

4. The fender as claimed in claim 3, wherein the at least two rims comprise at least six concentrically positioned rims.

5. The fender as claimed in claim 1, wherein the at least two rims comprise at least six concentrically positioned rims.

6. The fender as claimed in claim 1, wherein at least a part of the rims are movable relative to each other or the support surface.

7. The fender as claimed in claim 1, wherein the rims are made of aluminium.

8. The fender as claimed in claim 7, wherein the at least two rims comprise at least six concentrically positioned rims.

9. The fender as claimed in claim 1, wherein at least a part of at least one of the rims is inflatable.

10. A bogie for a train, comprising a fender as claimed in claim 1.

11. The bogie as claimed in claim 10, further comprising a contactless drive.

12. The bogie as claimed in claim 11, wherein the contactless drive comprises a number of permanent magnets on a rotating disc which are positioned such that rotation along a guiding strip or track creates a propelling force.

13. A train provided with a bogie as claimed in claim 11.

14. A track suitable for a bogie as claimed in claim 11.

15. The track as claimed in claim 14, further comprising a strip attached on either side of the track for the drive.

16. The track as claimed in claim 14, further comprising a recess provided with at least one strip for the drive.

17. The track as claimed in claim 14, wherein the track is provided with at least one recess such that a track section is configured to be placed over an existing railway track.

18. A method for moving an element, comprising providing a bogie as claimed in claim 11 and driving the bogie.

19. The fender as claimed in claim 10, wherein the at least two rims comprise at least six concentrically positioned rims.

20. A method for supporting an element, comprising providing a fender as claimed in claim 1.

* * * * *